(12) United States Patent
Qian et al.

(10) Patent No.: US 9,012,844 B2
(45) Date of Patent: Apr. 21, 2015

(54) SINGLE-SHOT PULSE CONTRAST MEASURING DEVICE BASED ON NON-HARMONIC LONG-WAVELENGTH SAMPLING PULSE

(75) Inventors: Liejia Qian, Shanghai (CN); Jingui Ma, Shanghai (CN); Peng Yuan, Shanghai (CN); Yongzhi Wang, Shanghai (CN); Dongfang Zhang, Shanghai (CN); Heyuan Zhu, Shanghai (CN)

(73) Assignee: Fudan University, Shanghai (CN)

( * ) Notice: Subject to any disclaimer, the term of this patent is extended or adjusted under 35 U.S.C. 154(b) by 714 days.

(21) Appl. No.: 13/372,505

(22) Filed: Feb. 14, 2012

(65) Prior Publication Data

US 2012/0228501 A1    Sep. 13, 2012

(30) Foreign Application Priority Data

Mar. 10, 2011   (CN) .......................... 2011 1 0048052

(51) Int. Cl.
*G01J 5/08* (2006.01)
*G01J 11/00* (2006.01)

(52) U.S. Cl.
CPC ...................................... *G01J 11/00* (2013.01)

(58) Field of Classification Search
CPC .......................................................... G01J 5/08
USPC ............................................ 250/338.1–338.5
See application file for complete search history.

(56) References Cited

U.S. PATENT DOCUMENTS

| | | | | |
|---|---|---|---|---|
| 5,528,612 | A * | 6/1996 | Scheps et al. | 372/23 |
| 6,898,000 | B2 * | 5/2005 | Jungerman et al. | 359/328 |
| 7,696,479 | B2 * | 4/2010 | DeCamp et al. | 250/339.06 |

\* cited by examiner

*Primary Examiner* — David Porta
*Assistant Examiner* — Faye Boosalis

(57) ABSTRACT

A single-shot pulse contrast measuring device based on non-harmonic long-wavelength sampling pulse includes a long-wavelength sampling light generation unit, a large-angle non-collinear sum-frequency cross-correlation unit and a high sensitivity signal receiving unit. The long-wavelength sampling light sum-frequency cross-correlator can allow that the beams are interacted with each other at the large non-collinear angle in the quasi-phase matching crystal, match the measuring window of the high sensitivity signal receiving system, and is in favor of eliminating the scattered light noise, thereby achieving the single measurement of the pulse contrast with large temporal window and high dynamic range. The single-shot pulse contrast measuring device of the present invention has good extensibility at the temporal window and dynamic range, and is adapted for measuring the contrast of the high-power laser with various wavelengths.

20 Claims, 2 Drawing Sheets

SINGLE-SHOT PULSE CONTRAST MEASURING DEVICE BASED ON NON-HARMONIC LONG-WAVELENGTH SAMPLING PULSE

BACKGROUND OF THE PRESENT INVENTION

1. Field of Invention

The present invention relates to a laser technology, and more particularly to a single-shot pulse contrast measuring device.

2. Description of Related Arts

High-intensity femtosecond chirped pulse amplification (CPA) system has achieved great development, however, it still faces several important challenges, one of which is how to obtain a high enough prepulse contrast. Currently, the focused intensity of the high-power laser has reached $10^{22}$ W/cm$^2$. To prevent the prepulses from generating the pre-plasma, it is required that the prepulse contrast of the laser pulse is at least larger than $10^{11}$:1. With further increasing the focused intensity of the laser, the demand for the pulse contrast is further improved. It challenges not only the pulse cleaning technology but also the pulse measurement technology.

The measurement of the pulse contrast is mainly based on the nonlinear correlating technology, where a pulse under test and a clean sampling pulse (e.g., second harmonic) are made cross-correlation in the form of sum frequency generation (SFG) or differential frequency generation (DFG) in the nonlinear crystal, and the contrast of the pulse under test can be obtained by measuring the dependence of the third harmonics or the idler on temporal delay. The clean sampling light is often generated by the second harmonic generation (SHG) of the pulse under test. Currently, in the scanning measurement, the dynamic range reaches $10^{11}$, and the commercial product appears. However, because most high-intensity CPA systems are operating at a very low pulse repetition rate, and even nonrepetitively, it is necessary to develop the single-shot pulse contrast measuring technology.

In the single-shot pulse contrast measuring device, time-to-space encoding must be employed to create a definite temporal window, and also a multielement detector capable of parallel detecting will be usually required, both resulting in a worse performance compared with the scanning measuring device. For the single-shot pulse contrast measuring device, the temporal window, the dynamic range and the resolution are three most important specifications. However, it is difficult for these three specifications to simultaneously meet the demands presently. For example, using the methods such as pulse front end tilting resulted from a grating and a train of discrete sampling pulse generated via Fabry-Perot etalon, the temporal window of the single-shot measurement can reach 200 ps. However, due to the limitation of the detectors, the dynamic range of these devices is only $10^6$-$10^7$, which can not meet the actual requirements.

SUMMARY OF THE PRESENT INVENTION

An object of the present invention is to provide a single-shot pulse contrast measuring device which has a high dynamic range (~$10^9$) and a large temporal window (~50 ps) simultaneously.

Therefore, the present invention provides and achieves a new non-harmonic long-wavelength sampling pulse technology, which effectively isolates the light scattering noise and increases the dynamic range, innovatively applies the large-angle non-collinear phase matching technology based on the periodically poled crystal, both technologies greatly improves the temporal window of the single-shot pulse contrast measuring device.

The single-shot pulse contrast measuring device based on the non-harmonic long-wavelength sampling light with the large temporal window and high dynamic range comprises a long-wavelength sampling light generation unit, a large-angle non-collinear sum-frequency cross-correlation unit and a high sensitivity signal receiving unit. The pulse laser emitted by the near-infrared laser source is divided into two portions via a beam splitter, one portion (portion I) is adapted to pump the optical parametric generation-optical parametric amplification (OPG-OPA) system for generating the long-wavelength sampling light, and the other portion (portion II) acts as the laser pulse under test.

The long-wavelength sampling light generation unit comprises an optical parametric generation-optical parametric amplification (OPG-OPA) system comprising two nonlinear crystals, a time delayer, an optical filter and two beam compressors. The laser pulse of portion I is also divided into two portions, one portion is used to pump the OPG crystal for generating the needed long-wavelength pulse, the other portion is used to pump the OPA crystal to amplify the long-wavelength pulse, both portions are compressed via beam compressors and their time delay is adjusted by the time delayer.

The large-angle non-collinear sum-frequency cross-correlation unit comprises a periodically polarized non-linear crystal, a periscope, two beam expanders and two plano-concave cylindrical lenses. Through the periscope, the polarization direction of the laser pulse under test (portion II) is rotated to the polarization direction of the long-wavelength sampling light (for the quasi-phase-matching non-linear crystal, the three interacting pulses can all be e-polarized for maximum efficiency). Both the lasers of under test and sampling, after proper beam expander and time adjustment, are separately focused in one dimension by a cylindrical plano-concave mirror and then make SFG cross-correlation in a periodically polarized lithium niobate crystal (PPLN). The SFG-correlating process generates the spatially distributed SFG signal by adjusting the noncollinear phase-matching angle of 30°-40° in the plane with larger beam size.

The high sensitivity signal receiving unit comprises a fiber array, a high-sensitive fast-response photomultiplier (PMT), an optical filter, a neutral attenuator and three plano-convex cylindrical lenses. The fiber array comprises 64-128 optical fibers with increasing lengths from one end of the array to the other (the length difference between adjacent fibers is determined by the response time of PMT). According to different signal magnitude of every channel, the optical attenuators with different attenuation level are added. The spatially distributed SFG correlation signals turn to be a series of time-delayed pulses via the fiber array, and then after spectral filtering, the pulses are received and changed into electric signals by the PMT. Finally these electric signals with different time delay are detected and analyzed into the contrast profile of the pulse under test.

The present invention uses the large-angle non-collinear correlation of wide beams to obtain the single-shot temporal window. The temporal window is decided by the width of the non-linear crystal (i.e., the beam width) and the non-collinear angle between the two interacting light. With a fixed crystal width, the temporal window increases with the non-collinear angle. In the conventional correlating process with a short-wavelength sampling pulse (i.e., SHG), the non-collinear phase matching (NPM) condition usually limits the non-collinear angle and consequently the maximum temporal widow.

Theoretical calculations demonstrate this limitation of non-collinear angle can be significantly released by using sapling wavelength much longer than the wavelength under test. Furthermore, the wavelength of the sampling light is longer, the allowable maximum NPM angle is larger, and consequently the maximum temporal window is larger. Currently, it has been proved that the idle light generated in the short-pulse pumped OPA is cleaner than the signal light and the pump light. Therefore, the present invention uses a pulse under test to pump an OPG-OPA system for generating the cleaner long-wavelength sampling light than the measured pulse. Of course, the present invention can also use a near-infrared semiconductor laser to seed the OPA pumped by the measured laser for generating the long-wavelength sampling pulse.

The application of long-wavelength sampling pulse can release the PM limit and increase the attainable maximum NPM angle in bulk crystals. Compared to the bulk crystals, the quasi-phase matching (QPM) crystals can further release the PM limit and consequently further increase the maximum temporal window. Furthermore, the large effective nonlinear coefficient of PPLN benefits for high conversion efficiency which can increase the measuring sensitivity. Therefore the present invention adopts QPM crystal (PPLN) as the correlating crystal. The QPM crystal allows the three interacting waves are all e-polarized for using the maximum effective nonlinear coefficient, thus one periscope is needed to rotate the polarization direction of pump by 90°. Sometimes, the non-collinear angle in the crystal is so large that it may exceed the critical angle of total reflection. To make use of the maximum non-collinear angle, the poling direction of QPM gratings must have an angle of 8°-12° with the crystal surface. In this kind of large-angle non-collinear correlation, the temporal window is in direct proportion to the size of the beam, so the measured and sampling beams must be appropriately expanded and the crystal must have an enough width. The two wide beams make the SFG cross-correlation in the PPLN crystal, generating the spatially distributed relation signals. The wavelength of the two beams participating in the cross-correlation is greatly different from the generated SFG signal light, which is in favor of completely eliminating the light noise.

The spatially distributed relation signals must be received by the multi-elements detector with the parallel detection capability. The spatially distributed relation signals are commonly detected by the linear or planar array CCD. However, the CCD has the large electric noise itself and low dynamic range, which limits the dynamic range of the single measurement. PMT has very low dark current (nA level), but it is a point detector and can not measure in parallel. Therefore, the present invention uses the fiber array containing 64-128 optical fibers to transform from the parallel measurement to the serial measurement. According to different signals of every channel, the optical attenuators with different sizes are added. The overall attenuation is added before the fiber array. An optical filter is added between the PMT and the fiber bundle for completely isolating the effect of the scattered light noise.

The single-shot pulse contrast measuring device has a detectable contrast maximum up to $10^9$, a temporal window of ~50 ps and resolution of ~1 ps, all specifications are comparable with that of the scanning scheme. Moreover, this device has good extensibility, for example a larger temporal window approaching ~200 ps can be anticipated by using a 50 mm-wide PPLN crystal. This invention can be valid for characterizing high-intensity lasers at various wavelengths.

These and other objectives, features, and advantages of the present invention will become apparent from the following detailed description, the accompanying drawings, and the appended claims.

Figure 1:
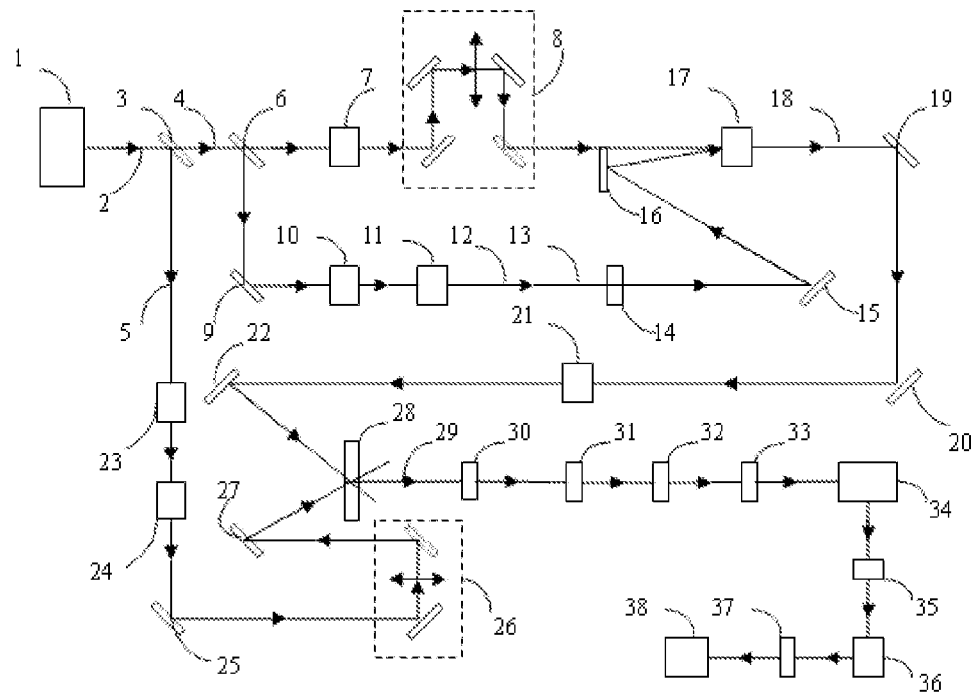
FIG. 1 is a perspective view of a single-shot pulse contrast measuring device according to a preferred embodiment of the present invention.

In the drawings, 1: near infrared pulse laser source; 2: pulse laser under test; 3: first beam splitter; 4: pulse laser for pumping the OPG-OPA system; 5: pulse laser for measuring; 6: second beam splitter; 7: first beam compressor; 8: first time delayer; 9: first reflector; 10: second beam compressor; 11: first non-linear crystal; 12: near infrared signal light generated by OPG; 13: residual pumping light; 14: first optical filter; 15: second reflector; 16: third reflector; 17: second non-linear crystal; 18: clean mid-infrared idle light generated by the OPA; 19: fourth reflector; 20: fifth reflector; 21: first beam expander; 22: first plano-concave cylindrical lens; 23: periscope; 24: second beam expander; 25: sixth reflector; 26: second time delayer; 27: second plano-concave cylindrical lens; 28: third non-linear crystal; 29: generated visible sum-frequency light; 30: first plano-convex cylindrical lens; 31: second plano-convex cylindrical lens; 32: neutral attenuator; 33: third plano-convex cylindrical lens; 34: fiber array; 35: second optical filter; 36: photomultiplier (PMT); 37: analog to digital converter (ADC); 38: computer

DETAILED DESCRIPTION OF THE PREFERRED EMBODIMENT

The present invention is further explained in detail with the accompanying drawings.

Referring to FIG. 1 of the drawings, a single-shot pulse contrast measuring device based on long-wavelength sampling pulse according to a preferred embodiment of the present invention is illustrated, wherein the device comprises a long-wavelength sampling light generation unit, a large-angle non-collinear sum-frequency cross-correlation unit and a high sensitivity signal receiving unit.

The pulsed laser 2 emitted by a near-infrared laser source 1 is divided into two portions via a first beam splitter 3, one portion (portion I) is the pulsed laser 4 which is adapted to pump an optical parametric generation-optical parametric amplification (OPG-OPA) system for generating the long-wavelength sampling light, and the other portion (portion II) acts as the laser pulse under test 5.

The long-wavelength sampling light generation unit comprises an optical parametric generation-optical parametric amplification (OPG-OPA) system, a first time delayer 8, a first optical filter 14 and two beam compressors (namely, a first beam compressor 7 and a second beam compressor 10). The OPG-OPA system comprises a second beam splitter 6, a first non-linear crystal 11, and a second non-linear crystal 17, wherein the first non-linear crystal 11 and the second non-linear crystal 17 are the lithium niobate bulk crystal ($LiNbO_3$). The pulsed laser 4 is also divided into two portions via the second beam splitter 6. One portion is compressed via the second beam compressor 10, and then sent to the first non-linear crystal 11, and then the near infrared signal light 12 is generated by the OPG process, and then the residual pump light 13 is filtered by the first optical filter 14. The other portion is compressed via the first beam compressor 7, and then its time delay is adjusted by the first time delayer 8, and then the other portion together with the near infrared signal light 12 at a certain non-collinear angle are sent to the second non-linear crystal 17 which meets a certain phase-matching angle for making the OPA interaction, thus generating the idler beam 18 which is the clean long-wavelength sampling light for detecting.

Figure 2:
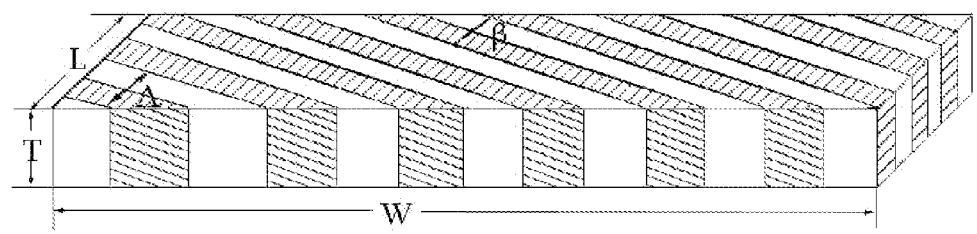
FIG. 2 is a specially designed PPLN crystal.

The large-angle non-collinear sum-frequency cross-correlation unit comprises a third non-linear crystal 28, a periscope 23, two beam expanders (namely, a first beam expander 21 and a second beam expander 24) and two plano-concave cylindrical lenses (namely, a first plano-concave cylindrical lens 22 and a second plano-concave cylindrical lens 27). Firstly, through the periscope 23, the polarization direction of the laser pulse under test 5 is rotated to the polarization direction of the long-wavelength sampling light 18 (for the third non-linear crystal 28, the three interacting pulses can all be e-polarized for maximum efficiency) and then the laser pulse under test 5 and the long-wavelength sampling light 18 are appropriately expanded by the second beam expander 24 and the first beam expander 21, respectively (wherein the diameter of the beam after being expanded can cover the third non-linear crystal 28), and then the laser pulse under test 5 and the long-wavelength sampling light 18 are one-dimensionally focused along the vertical direction by the second plano-concave cylindrical lens 27 and the first plano-concave cylindrical lens 22, respectively, so that the faculae of the laser pulse under test 5 and the long-wavelength sampling light 18 are long strip shapedly distributed along the horizontal direction. Meanwhile, the time delay of the laser pulse under test 5 is adjusted by the second time delayer 26. The one-dimensionally focused two beams of light at a larger non-collinear phase matching (NPM) angle (30°-40°) make the incidence to the third non-linear crystal 28 for making the sum frequency generation (SFG) cross-correlation function, thereby generating the sum frequency visible light 29 which are spatially distributed. The third non-linear crystal 28 is periodically polarized lithium niobate crystal (PPLN) whose concrete structure is shown in FIG. 2. The third non-linear crystal 28 is a long strip shaped cuboid with a length L of 1-2 mm, a width W of 10-15 mm, a thickness T of 0.5-1 mm. Different from the lithium niobate crystal made of bulk crystal (such as the crystal 11 and 17), the third non-linear crystal 28 is formed by the periodic polarization with a polarization period $\Lambda$ of 6-8 μm. An angle $\beta$ (8°-12°) is provided between the polarization direction and the light transmission plane for avoiding the effect of the total reflection. In experiments, the concrete parameters of the crystal are embodied as L=11 mm, W=1 mm, T=0.5 mm, $\Lambda$=6 μm and $\beta$=10°. The PPLN has large nonlinear coefficients and is capable of improving the conversion efficiency of the sum-frequency process and increasing the dynamic range of the measurement.

The high sensitivity signal receiving unit comprises a fiber array 34, a high-sensitive fast-response photomultiplier (PMT) 36, a second optical filter 35, a neutral attenuator 32 and three plano-convex cylindrical lenses (namely, a first plano-convex cylindrical lens 30, a second plano-convex cylindrical lens 31 and a third plano-convex cylindrical lens 33). The sum-frequency visible light 29 firstly passes through the first plano-convex cylindrical lens 30 for collimating at the vertical direction, and then passes through the second plano-convex cylindrical lens 31 for imaging at the horizontal direction such that the image at the fiber array 34 is the same as the image at the posterior surface of the third non-linear crystal 28 along the horizontal direction. Meantime, the sum-frequency visible light 29 also passes through the neutral attenuator 32 for attenuating the overall strength, and then passes through the third plano-convex cylindrical lens 33 for focusing at the vertical direction to be completely received by the fiber array 34. After passing through the fiber array 34, the spatially distributed sum-frequency light turns to be a time-distributed series of pulses, and then passes through the second optical filter 35 for filtering the scattered optical noise, and then reaches the PMT 36. The pulse electrical signal outputted by the PMT 36 passes through the analog to digital converter 37, and is inputted into a computer 38 for further processing the data, thereby obtaining the correlation curve which reflects the contrast of the laser pulse under test.

Figure 3:
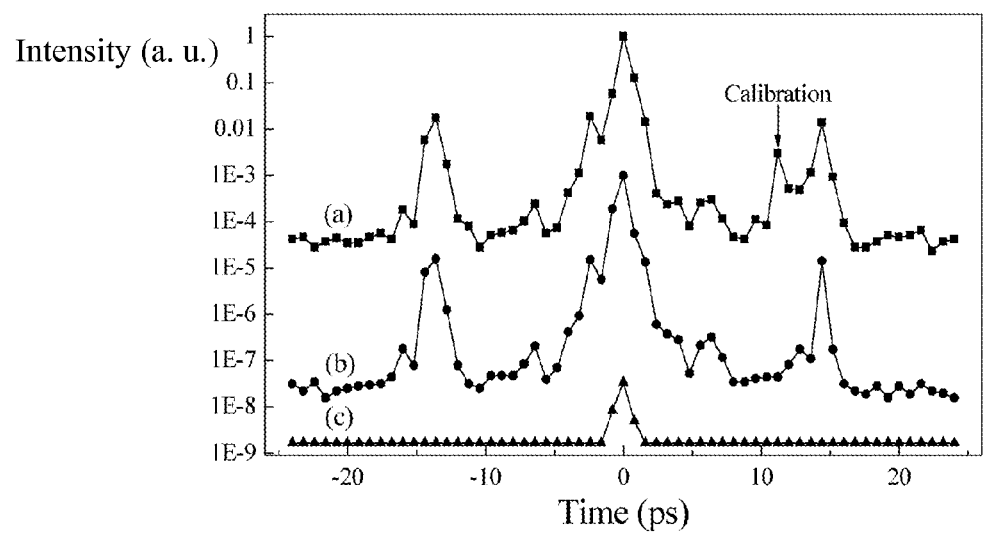
FIG. 3 is measured pulse contrast correlation traces obtained by experiments.
Figure 4:
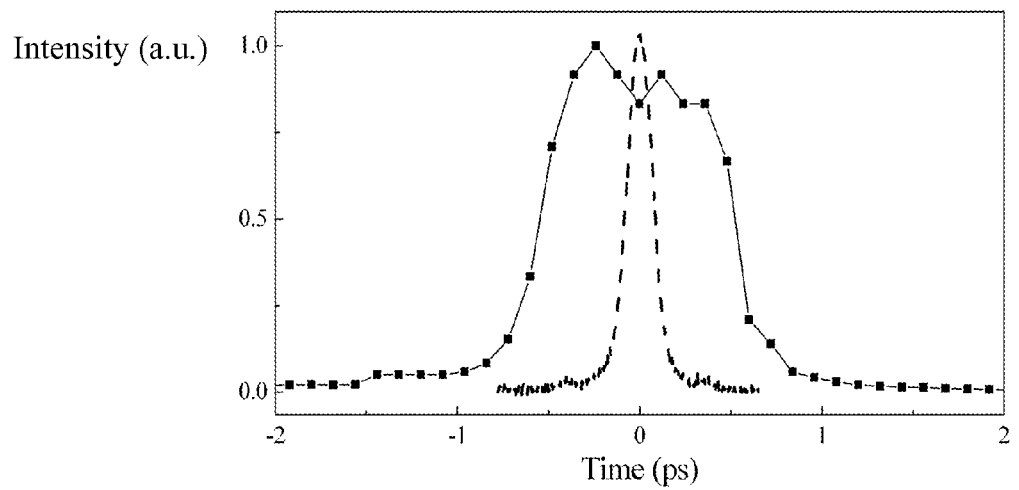
FIG. 4 is a resolution curve of the device.

In the preferred embodiment of the present invention, due to the fact that the wave bands of three wavelengths participating in acting are different from each other, the three wavelengths are greatly spaced from each other, and the light-scattering noise can be completely removed by a filter. The contrast measurement capability of the device of the present invention is obtained by gradually attenuating the signal beam till the system can not distinguish. As shown in FIG. 3, the measurement capability of the system can be determined by three sets of data when the signal light is not attenuated (as shown in FIG. 3$a$), is attenuated for $1 \times 10^3$ (as shown in FIG. 3$b$), and is attenuated for $3 \times 10^7$ (as shown in FIG. 3$c$), respectively. FIG. 3 shows that the measurement capability of the system can reach ~$10^9$, and the temporal window thereof can reach ~50 ps. To verify the accuracy of the measurement, an etalon with a thickness of 1 mm is added to the path of the measured pulse, and a small pulse caused by reflecting is generated at the trailing edge of the main pulse, wherein the position where the small pulse appears and the amplitude of the small pulse relative to the main pulse can be predicted. The measurement results are shown in FIG. 3($a$). Compared with FIG. 3($b$), the additional spike in FIG. 3($a$) is the pulse which is formed by reflecting back and forth the main pulse in the etalon. The position where the pulse appears and the amplitude of the pulse are the same as the predicted position and amplitude. Therefore, it is proved that the measurement is reliable. The resolution of the system is determined by the length L and the non-linear angle inside the crystal. Based on the experimental parameters, the resolution of the system is calculated to be about 1 ps. To further show the resolution of the system, the related sum-frequency signals are imaged on the fiber array at a proportion of 1:5 for ensuring that the fiber array has enough resolution, and the measurement results are shown in FIG. 4. In FIG. 4, the solid line is the cross-correlation curve obtained by the measurement, and the dashed line is an auto correlation curve of the measured pulse obtained by the auto correlator. Compared the pulse width obtained by the solid line with the pulse width obtained by the dashed line, it is shown that the resolution of the system is 1 ps, which is consistent with the calculation results.

Due to the fact that the temporal window of the single measurement is correlated with the width of the light receiving surface and the non-collinear angle inside the crystal, the larger single temporal window can be obtained by using the wider or smaller polarization period (namely, the usable maximum non-collinear angle is increased) PPLN. In the long wavelength sampling light generation unit of the present invention, the external semiconductor laser source is added instead of the OPG process, so that the semiconductor laser source with the appropriate wavelength can be chosen based on the laser wavelength which is needed to be measured.

Therefore, the range of the measured wavelength is large. As mentioned above, the device of the present invention has a good extensibility.

One skilled in the art will understand that the embodiment of the present to invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A single-shot pulse contrast measuring device based on non-harmonic long-wavelength sampling pulse, comprising:
   a long-wavelength sampling light generation unit, comprising an optical parametric generation-optical parametric amplification (OPG-OPA) system, a time delayer, an optical filter and two beam compressors, wherein a laser pulse under test is compressed via said beam compressors and a time delay of said laser pulse under test is adjusted via said time delayer, and then said OPG-OPA system is pumped, thereby generating a designed cleaner mid-infrared long-wavelength sampling light than said pulse under test;
   a large-angle non-collinear sum-frequency cross-correlation unit, comprising a periodically polarized non-linear crystal, a periscope, two beam expanders and two plano-concave cylindrical lenses, wherein a polarization direction of said laser pulse under test is rotated to a polarization direction of said long-wavelength sampling light through said periscope, three interacting pulses can all be e-polarized for said quasi-phase-matching non-linear crystal, and then said laser pulse under test and said long-wavelength sampling light are expanded by said two beam expanders, respectively, and then are one-dimensionally focused to said non-linear crystal by said two plano-concave cylindrical lenses, respectively, and then said laser pulse under test and said long-wavelength sampling light make a sum-frequency cross-correlation function at a non-collinear angle of 30°-40° in said non-linear crystal, thereby obtaining corresponding spatially distributed sum-frequency cross-correlation signals, wherein said non-linear crystal is a periodically polarized lithium niobate (PPLN) crystal disposed along a horizontal direction; and
   a high sensitivity signal receiving unit, comprising a fiber array, a high-sensitive fast-response photomultiplier (PMT), a filter, a neutral attenuator and three plano-convex cylindrical lenses, wherein said fiber array comprises 64-128 optical fibers with increasing lengths from one end of said array to the other, a length difference between adjacent fibers is determined by a response time of said PMT, according to different signal magnitude of every channel, optical attenuators with different attenuation level are added, wherein said spatially distributed SFG correlation signals turn to be a series of time-delayed pulses via said fiber array, and then after spectral filtering, said pulses are received and changed into electric signals by said PMT.

2. The single-shot pulse contrast measuring device, as recited in claim 1, further comprising an analog to digital converter and a computer, wherein pulse electrical signals outputted by said PMT pass through said analog to digital converter, and are inputted into said computer for further processing data, thereby obtaining a correlation curve reflecting a contrast of said laser pulse under test.

3. A single-shot pulse contrast measuring device based on non-harmonic long-wavelength sampling pulse, comprising:
   a long-wavelength sampling light generation unit, comprising an optical parametric generation-optical parametric amplification (OPG-OPA) system, a first time delayer, a first optical filter and a first beam compressor and a second beam compressor, wherein said OPG-OPA system comprises a second beam splitter, a first non-linear crystal, and a second non-linear crystal, wherein a pulsed laser is divided into two portions via said second beam splitter, one portion is compressed via said second beam compressor, and then sent to said first non-linear crystal, and then a near infrared signal light is generated by an OPG process, and then a residual pump light is filtered by said first optical filter, the other portion is compressed via said first beam compressor, and then a time delay of said other portion is adjusted via said first time delayer, and then said other portion together with said near infrared signal light at a certain non-collinear angle are sent to said second non-linear crystal which meets a certain phase-matching angle for making an OPA interaction, thus generating an idler beam, namely, a clean long-wavelength sampling light for detecting;
   a large-angle non-collinear sum-frequency cross-correlation unit comprising a third non-linear crystal, a periscope, a first beam expander, a second beam expander, a first plano-concave cylindrical lens and a second plano-concave cylindrical lens, wherein a polarization direction of a laser pulse under test is rotated to a polarization direction of said long-wavelength sampling light and then said laser pulse under test and said long-wavelength sampling light are expanded by said second beam expander and said first beam expander, respectively, and then said laser pulse under test and said long-wavelength sampling light are one-dimensionally focused along a vertical direction by said second plano-concave cylindrical lens and said first plano-concave cylindrical lens, respectively, so that faculae of said laser pulse under test and said long-wavelength sampling light are long strip shapedly distributed along a horizontal direction, meanwhile, a time delay of said laser pulse under test is adjusted by a second time delayer, said one-dimensionally focused two beams of light at a larger non-collinear phase matching (NPM) angle of 30°-40° make an incidence to said third non-linear crystal for making a sum frequency generation (SFG) cross-correlation function, thereby generating a spatially distributed sum frequency visible light; and
   a high sensitivity signal receiving unit comprising a fiber array, a high-sensitive fast-response photomultiplier (PMT), a second optical filter, a neutral attenuator, a first plano-convex cylindrical lens, a second plano-convex cylindrical lens and a third plano-convex cylindrical lens, wherein said sum-frequency visible light firstly passes through said first plano-convex cylindrical lens for collimating at said vertical direction, and then passes through said second plano-convex cylindrical lens for imaging at said horizontal direction such that an image at said fiber array is the same as an image at a posterior surface of said third non-linear crystal along said horizontal direction, meantime, said sum-frequency visible light also passes through said neutral attenuator for attenuating an overall strength, and then passes through said third plano-convex cylindrical lens for focusing at said vertical direction to be completely received by said fiber array, after passing through said fiber array, said spatially distributed sum-frequency light turns to be a time-distributed series of pulses, and then passes through said second optical filter for filtering scattered optical noise, and then reaches said PMT.

4. The single-shot pulse contrast measuring device, as recited in claim 3 wherein said first non-linear crystal and said second non-linear crystal are lithium niobate bulk crystal (LiNbO3).

5. The single-shot pulse contrast measuring device, as recited in claim 4, wherein said third non-linear crystal is a periodically polarized lithium niobate crystal (PPLN), is a long strip shaped cuboid with a length L of 1-2 mm, a width W of 10-15 mm, a thickness T of 0.5-1 mm, and is formed by a periodic polarization with a polarization period Λ of 6-8 μm, wherein an angle of 8°-12° is provided between said polarization direction and said light transmission plane of said third non-linear crystal for avoiding an effect of a total reflection.

6. The single-shot pulse contrast measuring device, as recited in claim 5, wherein for said third non-linear crystal, three interacting pulses can all be e-polarized for maximum efficiency.

7. The single-shot pulse contrast measuring device, as recited in claim 6, wherein a diameter of said expanded beam covers said third non-linear crystal in said large-angle non-collinear sum-frequency cross-correlation unit.

8. The single-shot pulse contrast measuring device, as recited in claim 7, further comprising a near-infrared laser source, and a first beam splitter, wherein a pulsed laser emitted by said near-infrared laser source is divided into two portions via said first beam splitter, one portion is said pulsed laser adapted for pumping said optical parametric generation-optical parametric amplification (OPG-OPA) system and generating said long-wavelength sampling light, and the other portion is said laser pulse under test.

9. The single-shot pulse contrast measuring device, as recited in claim 8, further comprising an analog to digital converter and a computer, wherein pulse electrical signals outputted by said PMT pass through said analog to digital converter, and are inputted into said computer for further processing data, thereby obtaining a correlation curve reflecting a contrast of said laser pulse under test.

10. The single-shot pulse contrast measuring device, as recited in claim 5, wherein a diameter of said expanded beam covers said third non-linear crystal in said large-angle non-collinear sum-frequency cross-correlation unit.

11. The single-shot pulse contrast measuring device, as recited in claim 4, wherein for said third non-linear crystal, three interacting pulses can all be e-polarized for maximum efficiency.

12. The single-shot pulse contrast measuring device, as recited in claim 11, wherein a diameter of said expanded beam covers said third non-linear crystal in said large-angle non-collinear sum-frequency cross-correlation unit.

13. The single-shot pulse contrast measuring device, as recited in claim 4, wherein a diameter of said expanded beam covers said third non-linear crystal in said large-angle non-collinear sum-frequency cross-correlation unit.

14. The single-shot pulse contrast measuring device, as recited in claim 3, wherein said third non-linear crystal is a periodically polarized lithium niobate crystal (PPLN), is a long strip shaped cuboid with a length L of 1-2 mm, a width W of 10-15 mm, a thickness T of 0.5-1 mm, and is formed by a periodic polarization with a polarization period Λ of 6-8 μm, wherein an angle of 8°-12° is provided between said polarization direction and said light transmission plane of said third non-linear crystal for avoiding an effect of a total reflection.

15. The single-shot pulse contrast measuring device, as recited in claim 14, wherein for said third non-linear crystal, three interacting pulses can all be e-polarized for maximum efficiency.

16. The single-shot pulse contrast measuring device, as recited in claim 15, wherein a diameter of said expanded beam covers said third non-linear crystal in said large-angle non-collinear sum-frequency cross-correlation unit.

17. The single-shot pulse contrast measuring device, as recited in claim 14, wherein a diameter of said expanded beam covers said third non-linear crystal in said large-angle non-collinear sum-frequency cross-correlation unit.

18. The single-shot pulse contrast measuring device, as recited in claim 3, wherein for said third non-linear crystal, three interacting pulses can all be e-polarized for maximum efficiency.

19. The single-shot pulse contrast measuring device, as recited in claim 3, wherein a diameter of said expanded beam covers said third non-linear crystal in said large-angle non-collinear sum-frequency cross-correlation unit.

20. The single-shot pulse contrast measuring device, as recited in claim 18, wherein a diameter of said expanded beam covers said third non-linear crystal in said large-angle non-collinear sum-frequency cross-correlation unit.

* * * * *